Aug. 31, 1943.   D. G. GRISWOLD   2,328,007
CHECK VALVE
Filed May 1, 1940   2 Sheets-Sheet 2
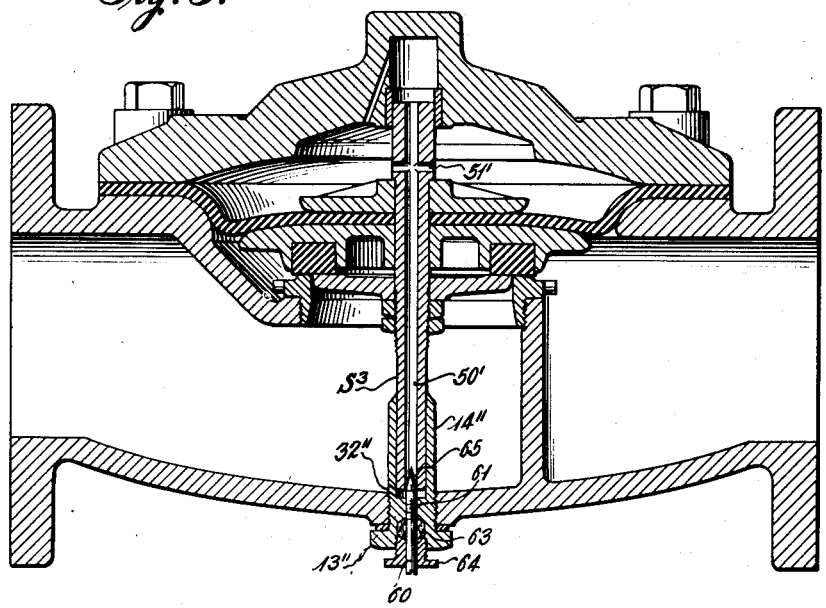
Fig. 3.
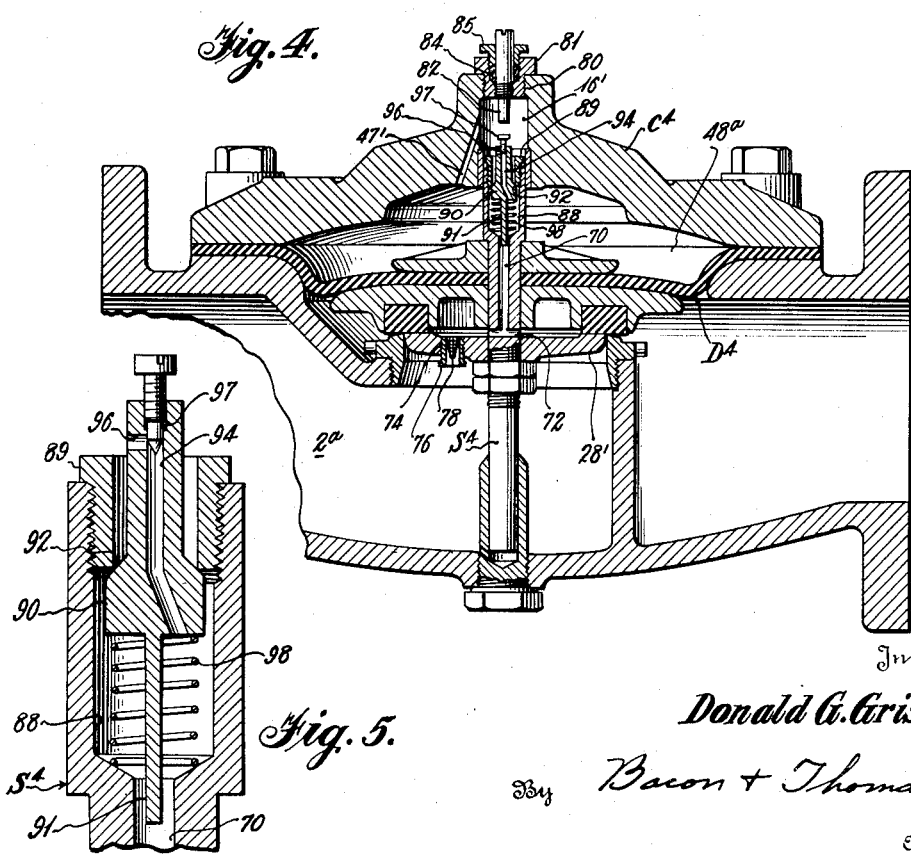
Fig. 4.
Fig. 5.
Inventor
Donald G. Griswold
By Bacon + Thomas
Attorneys Patented Aug. 31, 1943

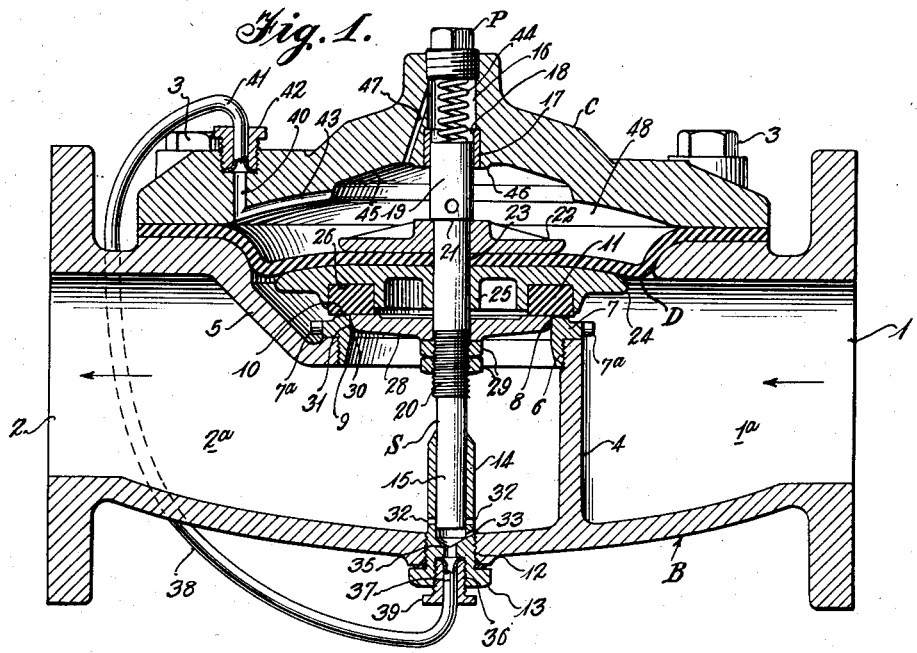
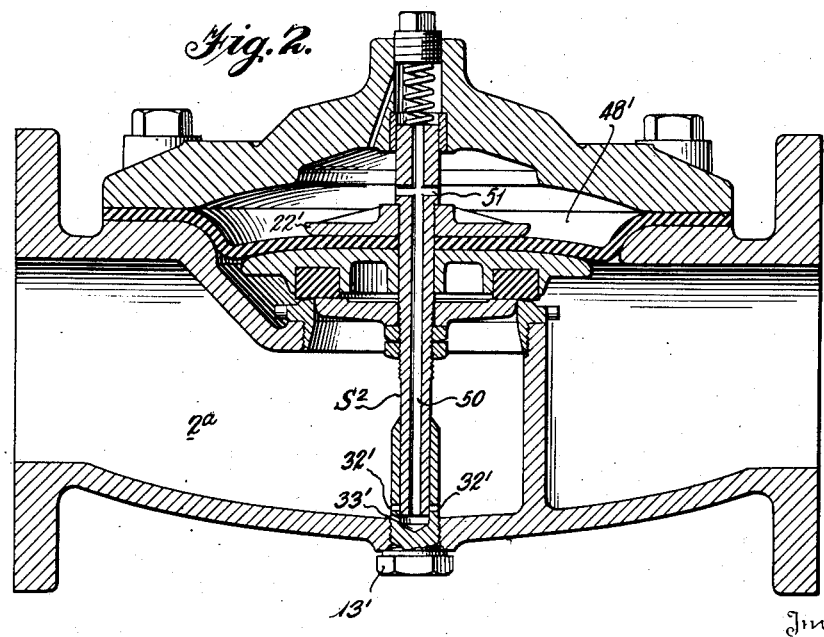

2,328,007

UNITED STATES PATENT OFFICE 2,328,007

CHECK VALVE

Donald G. Griswold, Alhambra, Calif., assignor to Clayton Manufacturing Company, Alhambra, Calif.

Application May 1, 1940, Serial No. 332,823

12 Claims. (Cl. 137—153)

The present invention relates to check valves, and more particularly to a self-governing check valve designed to operate efficiently and quietly, and to open automatically whenever the pressure on the inlet side of the valve is greater than that on the outlet side of the valve and to close automatically when these pressure conditions are reversed.

One of the most common objections to known types of check valves is that they have a tendency to slam closed whenever there is an interruption of flow or change in pressure. Such valves are usually constructed so that the closing member or valve disc, whether it be hinged or movable bodily, travels in a direction opposite to that of the normal flow of fluid to effect closing of the valve. In other words, the closing member travels in the same direction as the attempted return flow of fluid and the inertia of the fluid causes the disc to slam or suddenly strike against its seat. It is this sudden seating, resulting in the sudden stopping of the moving return stream, that sets up a back surge or a knock producing what is commonly referred to as "line shock" or "water hammer." Aside from the undesirable noise incident to hammering, there is the more serious danger of the piping bursting from sudden excess pressure or breaking as the result of vibratory strains imposed by repeated shock. This situation commonly occurs when a conventional check valve is used at the end of a long water line. Furthermore, when such check valve is used at the discharge of a pulsating pump, the valve disc is caused to strike its seat with every pulsation of the pump, producing frequent and repeated hammerlike blows on the valce disc and seat which quickly destroy the valve. The objection and danger increase, of course, with the size of the valve.

In contrast, the check valve of the present invention is constructed so that, regardless of size, it is impossible for the return flow to slam the valve shut and produce hammering or line shock. While in previous valves, the closing member has been directly urged against its seat by the attempted return flow and the closing member has thus been caused to travel in the same direction as the return flow, the closing member of the valve of the present invention is positively moved in a direction opposite to and against such flow to effect closing of the valve. Stated differently, the closing member of the present valve actually cuts off flow by moving in the same direction as that of the fluid normally flowing through the valve. The operation of the closing member of the present check valve is independent of the back surge or return flow, and contrary to the action of other valves, it does not suddenly cut off the return flow but does act directly thereon, closing slowly and positively at such a rate as to gradually cut off the return flow; thereby avoiding damage to the valve and the pipe line.

One important advantage of the above action is that in a pulsating line, the valve disc or closing member normally does not have sufficient time to respond to the rate of flow change and it, therefore, remains partially or fully open without the disc touching the seat on every pulsation of the pump, as is the case with an ordinary type of check valve. In normal operation the present valve is either fully open or fully closed. The fact that the valve is always wide open when the flow is in the normal direction constitutes a desirable advantage, in that it reduces the resistance to the flow of liquid and, therefore, results in lower pumping costs.

Valves constructed in accordance with the present invention operate upon a pressure differential in the inlet and outlet sides of the valve. The valve disc or closing member of the valve is operated by a diaphragm which is responsive to the differences in pressure. Means is associated with the outlet chamber of the valve for controlling the rate of flow of the pressure fluid to the diaphragm chamber. This control means is arranged so that the valve disc operates at two speeds, i. e., it may move rapidly toward its seat during the major portion of its travel and move at a comparatively slower rate during the remainder of its travel to effect a generally quick closing and a gradual throttling of the return flow during the final closing of the valve.

The primary object of the invention is to provide a check valve which will be free from the above noted objections and which will have the advantage of controlling the flow of water or other liquid without producing chattering, line shock or hammering. These objections are overcome and the advantages obtained by providing a check valve whose closing action is definitely controlled so as to preclude line shock and hammering.

One of the important objects of the invention is to provide a check valve of the diaphragm type which is automatically responsive to the pressure of the medium passing therethrough and which will close quietly against any return flow with a governed closing action.

Another object of the invention is to provide a check valve which will close quickly through a major portion of its closing movement and which will complete the closing movement relatively slowly; and further, which can be reopened to its fullest extent without undue delay.

Still another object of the invention is to provide a pressure operated check valve in which the stem of the valve is utilized, in conjunction with suitable ports, as a means for governing or regulating the flow of pressure fluid to a chamber to control the opening and closing of the valve.

A further object of the invention is to provide a check valve with a guided valve disc and a cooperating seat and choke-washer arranged to eliminate noise during opening and closing.

Another object of the invention is to provide a check valve construction in which the period of closing of the valve may be adjusted or varied as desired to meet specific conditions; for example, in certain installations employing large diameter pipe lines of great length and valves of large size, a total closing period of one to two minutes or more may be necessary to cut off flow without producing line shock or hammering.

A further object of the invention is to provide a check valve which is positive in its operation and which will not waiver or flutter between open and closed positions, but which in normal operation will be either completely closed or fully open; complete closing avoiding undesirable leakage through the valve, and full opening enabling the valve to operate with maximum efficiency without restricting or impeding flow therethrough.

A still further object of the invention is to provide an automatic check valve which is comparatively simple in construction, relatively inexpensive to manufacture, and which requires no substantial servicing.

Other and further objects of the invention will be apparent from the following description taken in connection with the accompanying drawings, in which:

Figure 1 illustrates one type of check valve in which the pressure in the outlet side of the valve is communicated through a tube exteriorly of the valve to a diaphragm chamber in the valve to effect the opening and closing of the valve and including means for retarding the closing movement of the valve disc toward the end of its travel;

Figure 2 illustrates another type of diaphragm check valve in which the stem of the valve is made hollow and the pressure in the outlet side of the valve is communicated through the stem to the diaphragm chamber to similarly effect and control the opening and closing of the valve;

Figure 3 illustrates still another type of diaphragm check valve somewhat similar to that shown in Figure 2 but in which an adjustable needle valve is employed to reduce the flow of pressure fluid through the valve stem into the diaphragm chamber as the valve disc approaches its limit of closing travel;

Figure 4 illustrates still another type of diaphragm check valve in which the pressure fluid for operating the valve is taken into the guide stem at a high point from the discharge side of the valve and in which the valve stem is provided with pilot valve means arranged to throttle the admission of pressure fluid into the diaphragm chamber toward the end of the movement of the stem to assure a slow closing of the valve and to permit relatively quick exhaust of such fluid to provide for rapid opening of the valve; and Figure 5 is an enlarged view of the pilot valve shown in Figure 4.

Referring now to Figure 1 of the drawings, the letter B indicates the valve body and the numerals 1 and 2, respectively, indicate the inlet and outlet sides of the valve. The letter C indicates the cap of the valve and the letter D indicates a circular diaphragm whose marginal portion is clamped between the body B and the cap C by any suitable number of cap screws 3.

The body B is provided at its inlet side 1 with a substantially vertical partition wall portion 4 forming an inlet chamber 1ª, and an angular wall portion 5 which cooperate with the wall 4 to form an outlet chamber 2ª. The wall portions 4 and 5 are merged to provide a circular opening 6 which is threaded and adapted to receive an annular valve seat 7. The valve seat 7 is provided with a circular opening 8 which flares outwardly toward the bottom of the valve body as indicated at 9. The upper surface of the valve seat 7 adjacent the opening 8 is provided with a declining beveled portion 10 adapted to cooperate with a valve disc 11 to form a leak-proof seal as will be explained more fully hereinafter. The valve seat 7 is further provided with circumferential projections 7ª adapted to be engaged by a spanner wrench for tightly securing the seat in the threaded opening 6.

The valve body B has a threaded opening 12 axially aligned with the opening 8 in the valve seat 7. An elongated plug 13 is threaded into the opening 12 and includes a tubular guide portion 14 for one end 15 of a valve stem S. The cap member C also has a recess 16 counterbored at 17 to receive a guide bushing 18 for the upper end 19 of the valve stem S. The recess 16 is located in the cap member C so that it is axially aligned with the tubular guide portion 14 and the opening 8 of the valve seat.

The valve stem S has a threaded portion 20 intermediate its lower end 15 and its upper end 19. The end 15 is of slightly less diameter than the threaded portion 20 and has a snug sliding fit in the tubular guide portion 14 of the plug 13. The upper end 19 of said valve stem is enlarged to provide a shoulder at 21 and, moreover, is snugly guided in the bushing 18. Thus, the plug 13 and bushing 18 are arranged to guide the stem 16 during vertical movement.

An upper diaphragm supporting plate 22 is adapted to be received upon the stem S and to abut the shoulder 21 with the upper side thereof. The upper side of the diaphragm D is engaged with the lower side of the plate 22 and is provided with an aperture 23 through which the valve stem S extends. The lower side of the diaphragm D is adapted to engage the upper side of a lower diaphragm supporting plate 24, and the valve stem S extends through a central boss 25 in said plate. The lower supporting plate 24 is also provided with a channel 26 formed in the lower side thereof to receive the valve disc 11 previously referred to. A combined clamping member and choke-washer 28 is adapted to be mounted upon the stem S and to engage the inner marginal portion of the valve disc 11. Clamping nuts 29 are threaded upon the portion 20 of the valve stem S and serve to retain the valve stem, the diaphragm supporting plates 22 and 24, the valve disc 11, and the choke-washer 28 in assembled relation with the diaphragm D.

The outer diameter of the clamping member or choke-washer 28 is preferably only slightly less than that of the opening 8 in the valve seat 7.

In a six inch valve, for example, the minimum radial clearance may be only three or four thousandths of an inch. The peripheral portion of the choke-washer 28 is preferably rounded, as indicated at 30, and is tapered outwardly and upwardly from said rounded portion to substantially its upper outer edge as indicated at 31. The rounded and tapered peripheral portions of the choke-washer 28 serve to gradually cut off the flow through the opening 8, and the beveled portion 10 of the valve seat 7 cooperates with the valve disc 11 to reduce eddying and to form a theoretical line-contact seal, whereby quiet, smooth and chatterless operation of the valve is obtained.

The tubular guide 14 for the lower end of the valve stem S is pierced by one or more transverse openings 32 and one or more comparatively smaller ports 33 arranged to establish communication between the outlet chamber 2ª of the valve and the interior of said guide. An axial passage 35 in the plug 13 communicates at one end with the hollow of the guide portion 14 and its opposite end merges into a threaded opening 36. One end 37 of a tube 38 is received in said threaded opening and a gland nut 39 is threaded into said opening to retain the tube 38 in assembled relation with the plug and in communication with the passage 35. The cap C is provided with a passage 40 and the opposite end 41 of the tube 38 is connected to said cap member by a conventional gland nut 42. A groove 43 in the underside of the cap C communicates with the passage 40.

The cap C is also provided with a cavity 45 shaped to receive the upper diaphragm supporting plate 22 when the valve is in open position. The end face of a boss 46 formed in said cavity serves as a stop engageable by said plate to limit the opening movement of the valve. A passageway 47 is arranged in said cap to establish communication between the cavity 45 and the recess 16.

The inner wall of the cap C, including the cavity 45, cooperates with the diaphragm D to form a chamber 48 adapted to receive fluid under pressure for actuating said diaphragm to cause the valve stem S to move downwardly and bring the valve disc 11 into contact with the valve seat 7 and thus close the valve. It will be apparent that fluid may readily flow into the chamber 45 through the passage 43 even when the diaphragm is in engagement with the underside of the cap C.

Figure 1 illustrates the check valve in its closed position. For illustrative purposes, let it be assumed that the outlet side 2 of the valve is connected with a pipe line, pipe system, or other apparatus in which it is desired to maintain a given pressure. Let it be further assumed that the pressure in the outlet chamber 2ª of the valve has dropped below the desired given pressure and below that in the inlet opening 1ª. It will then be apparent from the foregoing description that a corresponding pressure drop will occur in the chamber 48 through the return of fluid from said chamber through the passage 40, tube 38, passage 35, and port 33 to the outlet chamber 2ª. This exhaust or return of fluid is facilitated by the pressure in the inlet chamber 1ª acting upwardly upon the plate 24 and the lower side of the diaphragm D tending to bodily raise the valve stem S and lift the valve disc 11 from its seat to open the valve. After the valve has opened slightly, the pressure in the inlet chamber 1ª will become effective upon the choke-washer or clamping member 28 and produce a further differential pressure effective to open the valve. It will be noted that the initial rate of opening of the valve is slow due to the throttling effect on the return fluid by port 33. However, as the valve stem S starts to rise, the large ports 32 will be uncovered and fluid backing up through the tube 38 can then pass relatively quickly into the outlet chamber 2ª of the valve. In view of the fact that the ports 32 are of fairly large size, the fluid can be forced out of the diaphragm chamber 48 at a rapid rate to thereby permit quick opening of the valve. Any fluid in the recess 16 will, of course, be forced out through the passage 47 by the end 19 of the valve stem S.

With respect to closing of the valve, it will be understood that when a static pressure in excess of the inlet pressure prevails on the outlet side of the valve, or the desired dynamic pressure has been attained in the outlet side 2 of the valve, pressure will have been built up correspondingly in the diaphragm chamber 48 by virtue of the fact that fluid under pressure passes from the outlet chamber 2ª through the ports 32 in fairly large volume to effect a quick closing of the valve through a major portion of the travel of the valve stem S. However, as the lower end 15 of the valve stem assumes a position opposite the ports 32, the rapid supply of fluid to the diaphragm or pressure chamber 48 will be cut off, and that continued closing of the valve or downward movement of the valve stem S will proceed at a slower rate to effect the final closing of the valve because of the comparatively reduced flow of pressure fluid to the diaphragm chamber through the restricted port 33. It will be clear that the rate of restricted flow may be governed or varied by providing one or more ports 33, or by varying the size of the port 33 to meet given conditions.

During both the opening and closing of the valve, the valve disc 11 is guided by the stem S so that it uniformly disengages and contacts the face of the seat 7. The guiding of the valve disc 11 is important, especially during closing, because if the valve disc is not constrained it will seat upon one side first and a squeal or a noise comparable to "razzing" will result as it finally seats on the other side and cuts off the flow. Moreover, closing the valve against the flow of the return stream, instead of in a direction with such flow, eliminates slam and the hammering incident to sudden checking of the return flow. The choke-washer 28 also contributes to quiet operation of the valve in that it cooperates with the opening 8 in the valve seat to gradually restrict the flow and substantially cut it off just before seating of the valve disc 11 occurs, thereby eliminating any tendency of said valve disc to flutter.

Thus, it will be apparent that a two-speed check valve has been provided which is automatic and self-governing in its operation and which has the highly desirable advantage of quick opening and substantially quick closing, but whose final closing movement is regulated so as to eliminate sudden closing of the valve with its accompanying hammering and line shock.

In some instances, a helical compression spring 44 may be mounted in the recess 16 and retained in said recess by a plug P, as shown in Fig. 1. A spring so disposed will, of course, act upon the upper end of the stem S and to some extent oppose opening of the valve and aid in closing the valve. However, more important than these is the function of the spring 44 to offset any possible upward force resulting from the "buckling" effect of the diaphragm which might require a substantial excess of pressure in the chamber 48 above that in the inlet 1ᵃ to initiate the downward movement of the diaphragm. Another important function of the spring 44 is to supplement the closing pressure in the diaphragm chamber 48 by providing a slight auxiliary differential pressure sufficient to overcome the slightly increased resistance to closing as the choke member 28 and the valve disc 11 are urged against the fluid flowing through the valve seat opening 8, to effect the final closing action.

In order to illustrate one function of the spring, let it be assumed that a valve is installed in a line which has a flow capacity of one thousand gallons per minute, and that a pressure condition exists in said line such that the difference in pressure in the inlet and outlet of the valve is so slight that if the valve were to remain open it would permit a back flow of, say, 10 gallons per minute through the valve. Without a spring or other means to urge the valve shut, there may be so little resistance to the flow through the valve in a backward direction that there would be no substantial pressure differential available to initiate the closing movement of the valve, and if there was any tendency of the valve to stick open it might not start to close under these conditions.

If it be further assumed that the valve seat opening has an area of 12 square inches and that the spring 44 presses downwardly on the valve stem S with a pressure of 12 pounds, this would insure a potential resistance to backward flow in the check valve of at least one pound per square inch of the seat opening, regardless of the rate of flow. This pressure differential of one pound per square inch would be transmitted to the chamber 48 from the outlet chamber 2ᵃ through the tube 38, and if the full area of the diaphragm is 50 square inches, there would be a total closing force of 50 pounds acting upon the diaphragm to close the valve; simply as the result of introducing a 12 pound spring in the cap member C. Incidentally, the effect of the introduction of the 12 pound spring would be negligible during normal flow of the valve. Since the effective area of the opposite sides of the diaphragm is substantially equal, 50 square inches will be available to raise the diaphragm and compress the spring 44 so that the actual pressure required to compress the spring would be roughly 0.2 of a pound per square inch. In a valve having the foregoing proportions, it will be apparent that any spring used to set up the auxiliary differential pressure will have its effectiveness increased in direct proportion to the effective area of the diaphragm. It will be understood that, while a compression spring has been shown, a tension spring could be utilized to pull downwardly on the lower end 15 of the stem S to effect the same result.

Referring now to Figure 2 of the drawings, the construction is substantially the same as that described in connection with Figure 1, but is simplified to the extent that the tube 38 and fittings associated therewith have been dispensed with, and communication between an outlet chamber 2ᴬ of the valve and a diaphragm chamber 48' is established by passageways formed in the guide stem itself. Thus, the guide stem S² is provided with a longitudinal passageway 50 extending from end to end thereof and with a transverse or intersecting passageway 51 at a suitable point above the diaphragm supporting plate 22'. A plug similar to the plug 13 but with the passage 35 obstructed in any suitable manner may be employed in the valve shown in Figure 2, or a plug 13' constructed as presently illustrated may be used. The plug 13' is provided with large ports 32' corresponding to the ports 32 previously described and with a port 33' of relatively smaller diameter corresponding to the port 33 previously described.

The operation and governing of the valve shown in Figure 2 is the same as that described in connection with Figure 1, except that the fluid pressure will be communicated to the diaphragm chamber 48' through the passageways 50 and 51 of the valve stem instead of being conducted through a tube exterior of the valve.

The valve illustrated in Figure 3 utilizes a valve stem S³ similar to the valve stem S² of Figure 2. Thus, the valve stem S³ is provided with a longitudinal passageway 50' and an intersecting transverse passageway 51'. However, in lieu of using a restricted port in the plug to control the action of the valve during its final closing movement, a needle valve 60 is provided to throttle the entrance of fluid into the passageway 50' to slow up the closing movement of the valve and thereby prevent the same from slamming shut. The needle valve 60 is associated with a plug 13'' which has a threaded bore 61 in which the needle valve 60 is adjustably mounted. The stem 62 of the needle valve is surrounded by packing 63 and a packing gland 64 is threaded into the plug to compress the packing against said stem and thereby prevent leakage of fluid from the valve. The plug 13'' is also provided with a tubular guide portion 14'' having one or more large ports 32'' for permitting the passage of fluid from the outlet chamber of the valve into the passage 50' of the valve stem.

It will be understood that in the operation of the valve shown in Figure 3, the closing action of the valve may be better regulated than in the type of valve shown in Figure 2 because of the variability of the restricted flow afforded by the needle valve 60. The flow of the diaphragm chamber 48'' of the valve shown in Figure 3 will be comparatively rapid until the valve stem S³ reaches a position such that the point of the needle valve 60 enters the passageway 50'. Inasmuch as the end of the needle valve 60 is tapered, as indicated at 65, continued downward movement of said stem relative to said needle valve will gradually decrease the supply of pressure fluid to the diaphragm valve chamber and thereby slow up the closing action of the valve toward the end of its closing movement.

Figures 4 and 5 disclose a more complicated but nevertheless highly desirable construction for effecting smooth and quiet operation of the check valve. In the form illustrated, the valve stem S⁴ is provided with a longitudinal passageway 70 which merges into a transverse passageway 72 positioned at a point in said stem above a choke-washer or clamping member 28'. The clamping member 28' is provided with a recess 74 into which a screening plug 76 is threaded. The plug 76 contains a screening element 78 adapted to prevent the entry of any foreign matter into the passages of the valve stem.

The cover C⁴ of the valve shown in Figure 4 is provided with a threaded opening 80 adjacent to a counterbored recess 16'. A plug 81 is threaded into the opening 80 and an adjustable stop 82 is threadedly mounted in said plug. The stem portion 83 of said stop member is surrounded by packing 84 and a gland 85 is provided to compress the packing about said stem to provide a fluid tight seal therefor.

The stem S⁴, as best shown in Figure 5, is provided with an enlarged counterbore 88 at the upper end thereof which merges with the longitudinal passageway 70. The counterbore 88 is threaded at its upper end to receive a collar 89. A pilot valve 90 is adapted to be received in said counterbore and to be retained therein by the collar 89. As is clearly shown in the drawing, the pilot valve 90 is provided with a depending leg 91 which projects into the passageway 70 and serves as a guide, the size of the leg 91 being such as not to impede the flow of fluid through the passage 70 to an extent such as would prevent quick closing or opening of the valve at the appropriate times.

The exterior of the pilot valve 90 is beveled as indicated at 92 and adapted to seat upon the lower inner edge of the collar 89. The pilot valve 90 is further provided with a longitudinal passageway 94 and a transverse passageway 96. Flow through the passageways 94 and 96 of said valve is controlled by a needle valve 97 threadedly mounted in the upper end of the pilot valve. A compression spring 98 surrounds the guide 91 of the pilot valve 90 and normally tends to maintain the valve in seated position. However, the strength of the spring 98 is such that it does not exert any substantial pressure against the valve to effect closing thereof, but just sufficient to overcome the weight of the valve and keep the same closed until the spring is overcome by pressure acting downwardly upon the pilot valve 90 or until the head of the needle valve 97 abuts the stop 82 during the opening of the valve.

To regulate the closing of the check valve shown in Figure 4, the needle valve 97 is properly adjusted to constrict the flow of pressure fluid through the passageways 94 and 96, and thence through the recess 16', passage 47' into the diaphragm chamber 48ᵃ.

Assuming, for example, that the valve is about to open due to a pressure drop in outlet chamber 2ᵃ, the pressure in inlet chamber 1ᵃ acting upon the underside of the diaphragm D⁴ will subject the fluid in the diaphragm chamber 48ᵃ to pressure and while some of said fluid will back up through the passageways 94 and 96 in the pilot valve 90, the pressure created is normally sufficient to overcome the effect of spring 98 and force the pilot valve 90 downwardly in the stem S⁴, thereby permitting fluid in larger volume to by-pass the needle valve 97 and exhaust through said valve stem into the outlet chamber 2ᵃ. However, in the event that fluid pressure does not depress the pilot valve 90, said valve will be mechanically depressed by engagement of the needle valve 97 with the stop 82 as the stem S⁴ moves upwardly, and thus, quick opening of the check valve will be assured in any event.

It will be understood that the rate of opening movement of the check valve is greater after the pilot valve 90 has been displaced, since the return flow of spent fluid by passing said pilot valve is then at a greater rate than normally takes place through the passageways 94 and 96.

The pilot valve 90 will remain in its depressed position and the check valve will be wide open until a pressure in excess of the inlet pressure prevails on the outlet side of the check valve. This same pressure will then exist in the diaphragm chamber 48ᵃ and cause the valve stem S⁴ to move rapidly downwardly to cut off flow through the valve. After the valve stem S⁴ has moved downwardly a distance sufficient for the lower edge of the collar 89 to engage the beveled portion 92 of the pilot valve 90, rapid flow of pressure fluid to the diaphragm chamber will be cut off and the rate of flow through passageways 94 and 96 restricted to that afforded by the adjustment of the needle valve 97. In this manner the final closing movement of the valve is definitely slowed up.

In a valve of the type shown in Figure 4, the portion of the stem stroke during which relatively slow closing movement is desired can obviously be accurately determined by the adjustment of stop 82. Furthermore, the needle valve 97 in pilot valve 90 may be adjusted to predetermine the rate of travel during said portion of the stem stroke. An important feature of this type of check valve is that the initial travel of the stem during its opening movement is not necessarily at the same rate as the final closing movement, because, as has been pointed out, displacement of the pilot valve 90 and quick opening of the check valve may begin before the needle valve 97 actually engages the stop 82.

It will be understood that the principles of the invention may be embodied in valves different from those illustrated herein without departing from the spirit of the invention and the scope of the appended claims.

I claim:

1. In a check valve comprising a body, a flexible diaphragm for controlling the flow of fluid through said body, and a pressure chamber for operating fluid above said diaphragm, said diaphragm being arranged to be actuated downwardly to effect cessation of flow through said body; a valve stem connected to said diaphragm; a guide in said body for said valve stem, said guide being hollow and having port means for the passage of fluid thereinto; and passage means for conducting operating fluid from said guide to said pressure chamber to effect closing of said valve, said valve stem being cooperable with said port means to decrease the flow of fluid to said pressure chamber as said valve stem moves downwardly.

2. A self-governing check valve comprising a body; a flexible diaphragm for controlling the flow of fluid through said body; a pressure chamber for operating fluid above said diaphragm, said diaphragm being arranged to be actuated downwardly to effect cessation of flow through said body; a valve stem connected to said diaphragm; guide means in said body for said valve stem, said guide means having spaced ports for the passage of fluid thereinto, at least one of said ports being adapted to be covered by said valve stem as said valve stem nears the end of its downward travel; and passage means for establishing communication between said guide means and said pressure chamber, whereby operating fluid can be conducted from said guide means to said pressure chamber to effect closing of said valve.

3. An automatically governed check valve comprising a body; a flexible diaphragm for controlling the flow of fluid through said body; a pressure chamber for operating fluid for said diaphragm; a valve stem connected to said diaphragm; guide means in said body for said valve stem, said guide means being hollow and having longitudinally spaced ports of different size for the passage of fluid thereinto, the uppermost of said ports only being adapted to be covered by said valve stem as said valve stem nears the end of its downward travel, the lowermost of said ports being the smallest in size; and passage means for fluid between said guide means and said pressure chamber.

4. In a check valve comprising a body having inlet and outlet chambers, a flexible diaphragm for controlling the flow of fluid from said inlet to said outlet chamber, and a pressure chamber for operating fluid for said diaphragm; a valve stem connected to said diaphragm; a guide in said outlet chamber for said valve stem, said guide being hollow and having port means for the passage of fluid thereinto from said outlet chamber, said valve stem being adapted to cooperate with said port means to decrease the flow therethrough as said stem moves downwardly; and passage means exterior of the valve body for establishing communication between said guide and said pressure chamber.

5. In a check valve comprising a body, a flexible diaphragm for controlling the flow of fluid through said body, and a pressure chamber for operating fluid for said diaphragm; an imperforate valve stem connected to said diaphragm; a guide in said body for said valve stem, said guide being hollow and having port means for the passage of fluid thereinto; and a tube communicating with said guide and said pressure chamber for conducting fluid from said guide to said pressure chamber, said valve stem being cooperable with said port means to decrease the flow of fluid to said pressure chamber as said valve stem moves downwardly.

6. In a check valve comprising a body having inlet and outlet chambers, a flexible diaphragm for controlling the flow of fluid from said inlet to said outlet chamber, and a pressure chamber for operating fluid above said diaphragm, said diaphragm being arranged to be actuated downwardly to effect cessation of flow between said chambers; a valve stem connected to said diaphragm; a guide in said outlet chamber for said valve stem, said guide having port means for the passage of fluid thereinto from said outlet chamber, said valve stem being adapted to cooperate with said port means to decrease the flow therethrough as said valve stem approaches the end of its downward travel, whereby to retrict the rate of flow to said pressure chamber as said valve is about to close; and passage means within the valve body for establishing communication between said guide and said pressure chamber for conducting operating fluid from said guide to said pressure chamber.

7. In a check valve comprising a body, a flexible diaphragm for controlling the flow of fluid through said body, and a pressure chamber for operating fluid above said diaphragm, said diaphragm being arranged to be actuated downwardly to effect cessation of flow through said body; a valve stem connected to said diaphragm; a guide in said body for said valve stem, said guide being hollow and having port means for the passage of fluid thereinto, said valve stem having passage means communicating with said guide and pressure chamber for conducting operating fluid from said guide to said pressure chamber to effect closing of said valve, said valve stem being cooperable with said port means to decrease the flow of fluid to said pressure chamber as said valve stem approaches the limit of its downward travel.

8. A check valve comprising a valve body having an inlet chamber, an outlet chamber, and partition means separating said chambers; a cover member; a diaphragm between said body and said cover member for controlling the flow of fluid from said inlet chamber to said outlet chamber, said cover member and said diaphragm cooperating to provide a pressure chamber for operating fluid, said diaphragm being arranged to be actuated downwardly to effect cessation of flow between said chambers; a reciprocable valve stem connected to said diaphragm; a guide for said stem in said outlet chamber, said guide being hollow to receive one end of said valve stem and having port means extending therethrough for establishing communication between the interior of said hollow guide and said outlet chamber; passage means associated with said guide for conducting fluid under pressure from the interior thereof to said pressure chamber to effect closing of said valve, said valve stem being movable by said diaphragm to a position opposite said port means to decrease the flow of fluid to said pressure chamber as said valve stem approaches its lower limit of travel.

9. A check valve comprising a valve body having an inlet chamber, an outlet chamber, and partition means separating said chambers; a cover member; a flexible diaphragm between said body and said cover member for controlling the flow of fluid from said inlet chamber to said outlet chamber, said cover member and said diaphragm cooperating to provide a pressure chamber for operating fluid, said diaphragm being arranged to be actuated downwardly to effect cessation of flow between said chambers; a reciprocable valve stem connected to said diaphragm; a guide for said stem in said outlet chamber, said guide having a plurality of ports extending therethrough for establishing communication between the interior of said guide and said outlet chamber; conduit means communicating with said guide and said presure chamber for conducting fluid under pressure from said guide to said pressure chamber to effect closing of said valve, said valve stem being movable by said diaphragm to a position opposite at least one of said ports to decrease the flow of fluid to said pressure chamber as said valve stem approaches its lower limit of travel.

10. A check valve comprising a valve body having an inlet chamber, an outlet chamber, and partition means separating said chambers; a cover member; a diaphragm between said body and said cover member for controlling the flow of fluid from said inlet chamber to said outlet chamber, said cover member and said diaphragm cooperating to provide a pressure chamber for operating fluid; a reciprocable valve stem connected to said diaphragm; a guide in said cover for one end of said stem; a second guide in said outlet chamber for the opposite end of said stem, said second guide having a plurality of ports extending therethrough for establishing communication between the interior of said guide and said outlet chamber; conduit means communicating with said guide and said pressure chamber for conducting fluid under pressure from said guide to said pressure chamber, said valve stem being movable downwardly by said diaphragm to a position such as to cover at least one of said ports as said stem approaches its lower limit of travel while leaving another of said ports uncovered, whereby pressure fluid may continue to flow to said pressure chamber at a reduced rate to effect final closing of the valve.

11. A check valve comprising a valve body having an inlet chamber, an outlet chamber, and a wall separating said chambers; a cover member; a flexible diaphragm between said body and said cover member, said cover member and said diaphragm cooperating to provide a pressure chamber for operating fluid; a valve seat carried by said wall; a valve disc adapted to engage said seat and form a leak-proof seal therewith; a reciprocable valve stem arranged in axial alignment with said valve seat; means connecting said valve disc and diaphragm with said valve stem; guide means for said valve stem in said valve body and cover member, respectively, said guide means in said body being hollow and having ports of different size, the larger port being disposed above the smaller port and adapted to be closed by the lower end of said valve stem as it approaches its lower limit of travel; and means for establishing communication between said hollow guide means and said pressure chamber.

12. An automatic check valve comprising a body having an inlet chamber and an outlet chamber; a flexible diaphragm for controlling the flow of fluid from said inlet chamber into said outlet chamber; a pressure chamber for operating fluid above said diaphragm, said diaphragm being arranged to be actuated downwardly to effect cessation of flow between said chambers; a valve stem connected to said diaphragm; guide means in said body for guiding the opposite ends of said valve stem; resilient means in said body arranged to urge said valve stem downwardly; and passage means for conducting operating fluid under pressure from said outlet chamber to said pressure chamber to effect closing of said valve, including a longitudinal passageway in said valve stem.

DONALD G. GRISWOLD.